Figure 1:
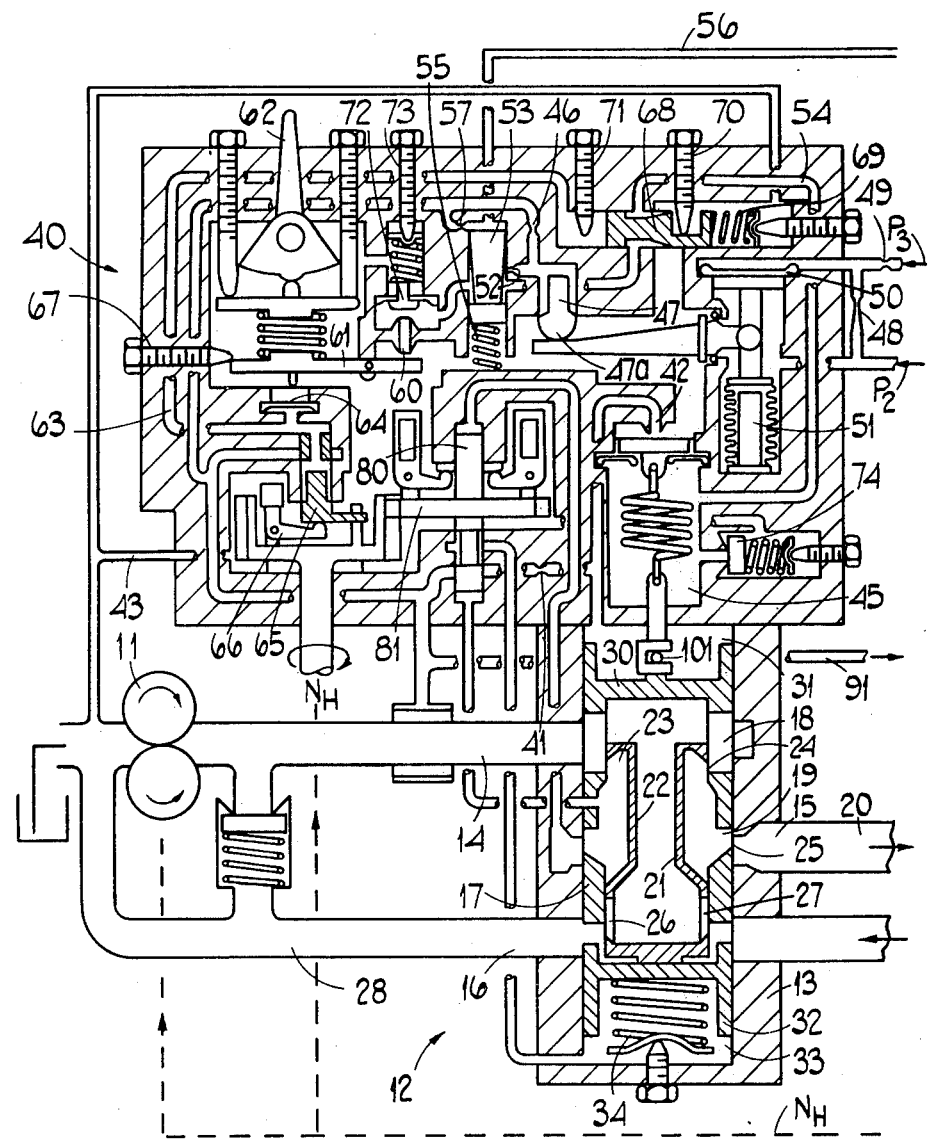

United States Patent [19]

Smith

[11] 4,019,317

[45] Apr. 26, 1977

[54] FLUID FLOW CONTROL VALVE FOR GAS TURBINE ENGINE FUEL CONTROL SYSTEM

[75] Inventor: Trevor Stanley Smith, Sutton Coldfield, England

[73] Assignee: Lucas Industries Limited, Birmingham, England

[22] Filed: Sept. 22, 1975

[21] Appl. No.: 615,829

[30] Foreign Application Priority Data

Oct. 23, 1974 United Kingdom ............ 45918/74

[52] U.S. Cl. ..................... 60/39.28 R; 137/492.5; 137/597; 137/614.18
[51] Int. Cl.² ...................... F02C 9/08; F02C 9/10
[58] Field of Search ............ 60/39.28 R; 137/492, 137/492.5, 597, 614.18

[56] References Cited

UNITED STATES PATENTS

| | | | |
|---|---|---|---|
| 2,989,849 | 6/1961 | Torell | 60/39.28 R |
| 3,295,314 | 1/1967 | Matthews | 60/39.28 R |
| 3,313,106 | 4/1967 | Matthews | 60/39.28 R |
| 3,508,396 | 4/1970 | Ifield | 60/39.28 R |
| 3,531,936 | 10/1970 | Widell | 60/39.28 R |
| 3,538,707 | 11/1970 | Karol | 60/39.28 R |
| 3,587,231 | 6/1971 | Fisher | 60/39.28 R |

*Primary Examiner*—Clarence R. Gordon

[57] ABSTRACT

A fluid flow control valve includes a body having an inlet and two outlets. A metering control element is slidable in the body to regulate flow through one of the outlets. A combined spill and throttle control element is slidable within the metering element so as simultaneously to control metered flow between the inlet and the one outlet, and spill flow between the inlet and the other outlet. Both of the control elements are responsive to respective servo pressure signals.

9 Claims, 2 Drawing Figures

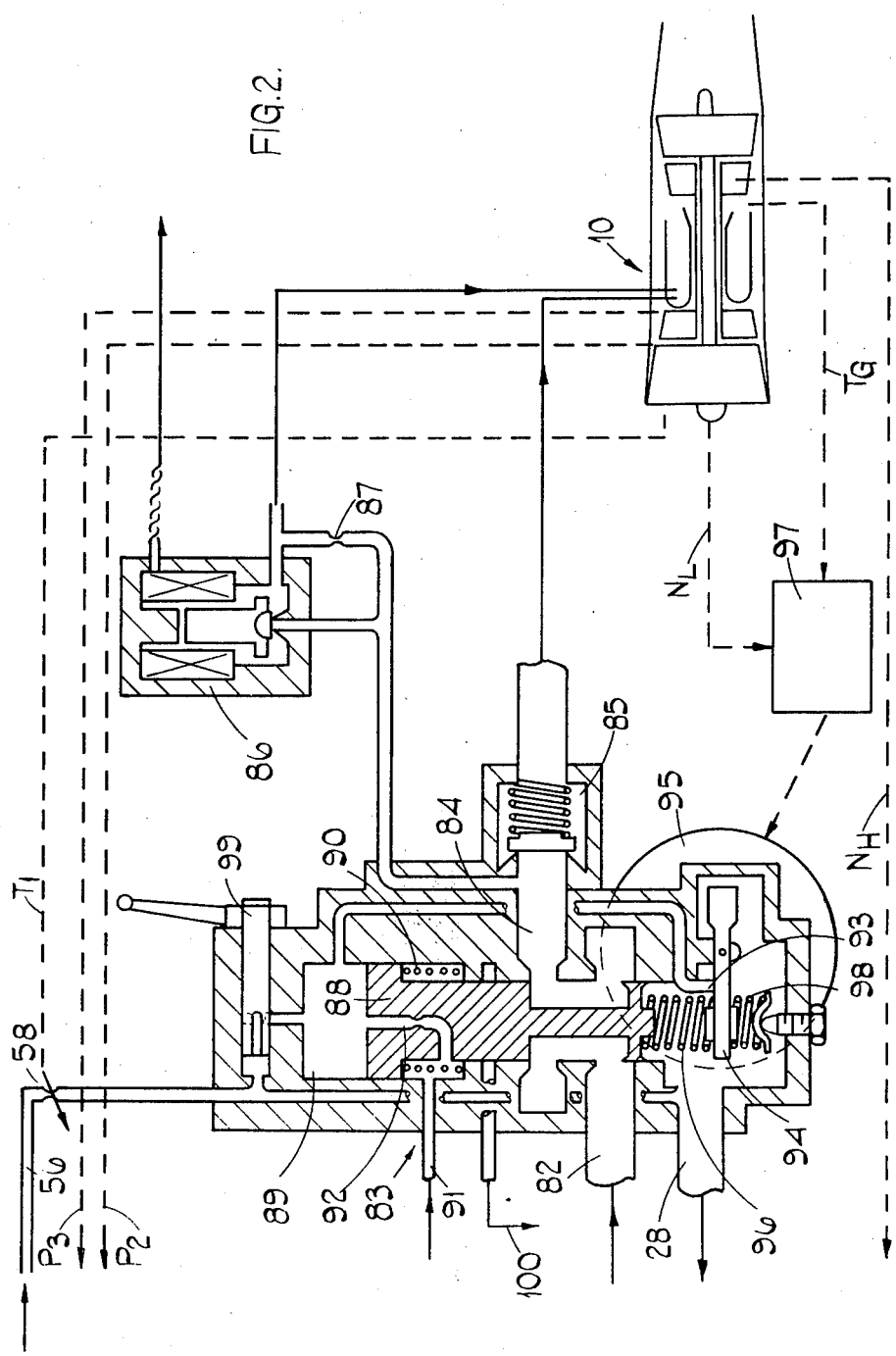

FLUID FLOW CONTROL VALVE FOR GAS TURBINE ENGINE FUEL CONTROL SYSTEM

This invention relates to fluid flow control valves for gas turbine engine fuel control systems.

According to the invention a fluid flow control valve for a gas turbine engine fuel control system comprises a body having an inlet and first and second outlets, first and second control elements which are slidable relative to each other and to said body, said first control element defining, in part, a variable metering orifice and said first and second control elements co-operating to define a throttle valve, said metering orifice and said throttle valve being in series between said inlet and said first outlet, said first and second control elements also co-operating to define a spill valve between said inlet and said second outlet, movement of said second control element to increase flow through said first outlet simultaneously acting to decrease flow through said second outlet, means responsive to a first servo pressure signal for slidably moving said first control element, and means responsive to variations in a second servo pressure signal for slidably moving said second control element.

An example of the invention will now be described with reference to the accompanying drawings.

FIGS. 1 and 2 which should be read in conjunction with one another show separate parts of a gas turbine engine fuel control system.

The control system shown is intended for use with a twin-spool gas turbine engine, indicated at 10, that is an engine having an inner, low speed shaft on which are mounted a low pressure compressor and a turbine, and an outer, concentric, high speed shaft on which are mounted a high pressure compressor and a turbine.

A positive-displacement pump 11 is driven at a speed dependent on the speed $N_H$ of the engine high speed shaft. Pump 11 delivers fuel to the engine 10 via a control valve 12. Valve 12 has a body 13 provided with an inlet 14 and first and second outlets 15, 16. Slidable within the body 13 is a sleeve control element 17 provided with ports 18 which are in constant communication with inlet 14, and also provided with ports 19. Ports 19 co-operate with the outlet 15 to define a variable metering orifice through which fuel flows, in use, to the engine via a passage 20.

Slidable within the element 17 is a further control element 21. Element 21 has a portion 22 of reduced diameter which defines an annular space 23 between the elements 17, 21. One end of the element 21 co-operates with the ports 18 in the element 17 to define a throttle valve 24 in series with the metering orifice 25 which is defined by the outlet 15 and ports 19. The other end of the metering element 21 is provided with ports 26 which communicate with the inlet 14 and co-operate with an end of the element 17 to define a spill valve 27 through which fuel can flow from the inlet 14 to the outlet 16, and thence via a passage 28 to the upstream side of the pump 11.

Control element 17 has a piston portion 30 which is responsive to a first servo pressure signal in a chamber 31. A piston 32 is responsive to a second servo pressure signal in a chamber 33 and abuts the second control element 21. Piston 32 is urged into abutment with element 21 by an adjustable spring 34, by the second servo pressure signal in chamber 33 and by the pump delivery pressure acting on the inside of element 21. The effect is such that element 21 and piston 32 are always in contact and move as a unit.

A pressure signal generating arrangement, indicated at 40, has a fixed restrictor 41 and a valve 42 in series between the outlet of pump 11 and a low pressure return line 43 to the upstream side of pump 11. The pressure intermediate restrictor 41 and valve 42 provides the first servo signal pressure in the chamber 31. The control member 44 for valve 42 is resiliently coupled to the piston 30 and is responsive to an intermediate pressure in a chamber 45.

The pressure in chamber 45 is derived from the outlet of pump 11 via a fixed restrictor 46 and a valve 47. A control member 47a for valve 47 balances the force due to the pressure intermediate restrictor 46 and valve 47, this force acting on member 47a against pressures $P_2$ and $P_3$ at the outlets of the engine low pressure and high pressure compressors respectively. These pressures act on valve 47 via fixed restrictors 48, 49, a diaphragm unit 50 and an evacuated bellows 51. An imbalance in the forces on member 47a causes the latter to move in a direction to maintain the pressure intermediate restrictor 46 and valve 47 a predetermined function of pressures $P_2$, $P_3$.

The zone intermediate restrictor 46 and valve 47 communicate via a further restrictor 52 and a valve 53 with a passage 54. Passage 54 communicates, in turn, with the chamber 45. Valve 53 is movable against a spring 55 by a control pressure in a line 56. Pressure in line 56 is derived from the outlet of pump 11 via a fixed restrictor 57 and a variable restrictor 58 (FIG. 2), restrictor 58 being positioned in accordance with the temperature $T_1$ at the inlet of the low pressure compressor of the engine 10. The control pressure in line 56 is thus proportional to the temperature $T_1$ and an increase in this pressure urges valve 53 to reduce flow through restrictor 52.

The end of passage 54 remote from the chamber 45 communicates with the low pressure return line 43 via an orifice 60. The flow through orifice 60 is controlled by a lever closure member 61 which is movable in a direction to increase the pressure in passage 54 by movement of an engine speed selector lever 62 in either direction away from the central position shown. Closure member 61 is resiliently coupled to lever 62 and is urged in a direction to increase flow through orifice 60, and thereby to decrease the intermediate control pressure in passage 54, by an increase in a speed responsive pressure signal in a line 63, acting on a diaphragm 64. The pressure signal in line 63 is derived from the pump outlet via a spool valve 65 which is axially positioned by a governor arrangement 66 driven at the speed $N_H$ of the engine high speed shaft. The closure member 61 is thus positioned in accordance with the difference between actual and desired speeds of the engine.

Movement of the lever closure member 61 in response to a rapid demand for reduction in engine speed is limited by an adjustable stop 67. Passage 54 can communicate with the low pressure return line 43 via a further spool valve 68. Valve 68 is subjected to the speed-responsive pressure signal in the line 63 and is biased against this pressure by an adjustable spring 69. Movement of valve 68 to the right, as seen in the drawing, is limited by an adjustable stop 70, and movement to the left by an adjustable stop 71. Spring 69 is adjusted so that in normal running conditions spool valve 68 is biased against stop 70 by the pressure in passage 63, in which position it provides an upper, limiting value for the intermediate control pressure in passage 54. The adjustable stop 70 thus acts as an acceleration control. When the engine speed is low, as for example during start-up, the speed-responsive pressure signal in passage 63 is also low and spool valve 68 moves to the left against the stop 71. In this position valve 68 permits a much reduced flow from passage 54 to low pressure, and the intermediate control pressure is increased.

In the event that the intermediate control pressure in passage 54 falls below a predetermined level, orifice 60 can be shut off by a diaphragm closure element 72 which is biased against the intermediate control pressure by an adjustable spring 73. In the event that the intermediate control pressure exceeds a further predetermined value a spring-biased relief valve 74, communicating with chamber 45, allows this pressure to escape to the low pressure return line 43. Upper and lower limits of the intermediate control pressure in chamber 45 are thereby set by the valves 72, 74.

A spool control valve 80 can be urged in opposite directions by the pressure in the outlet 15 of valve 12 and the pressure in the annular space 23 within valve 12. Spool valve 80 is also movable by a further governor arrangement 81, driven at speed $N_H$ by governor arrangement 66. Valve 80 is operable to connect chamber 33 either to the outlet of pump 11 or to the low pressure return line 43. The pressure in chamber 33 is thus dependent on the pressure drop across the metering orifice 25 and on the engine speed $N_H$. The arrangement is such that the throttle valve 24 controls flow through the metering orifice 25 so that the pressure drop across orifice 25 remains substantially constant for a given engine speed.

Passage 20 connects valve outlet 15 to the inlet 82 of a combined shut-off and limiting valve arrangement 83 (FIG. 2). Valve 83 has an outlet 84 which communicates with the main burners of the engine 10 via a pressurizing valve 85. Outlet 84 also communicates with pilot burners of the engine 10 via a solenoid valve 86 and a flow restrictor 87, arranged in parallel. Valve 83 has a control element 88 responsive to an increase in a servo pressure signal in a chamber 89 to decrease flow from the inlet 82 to the outlet 84. Control element 88 is biased against the pressure in chamber 89 by a spring 90. The pressure in chamber 89 is derived from the outlet of pump 11 via a passage 91, a fixed restrictor 92 and a pilot valve 93, chamber 89 lying between restrictor 92 and valve 93.

Valve 93 has a lever control member 94 movable by a torque motor 95 and biased in a direction to open valve 93 by a spring 96 which also engages the control element 88. Torque motor 95 is responsive to electrical signals from a circuit 97 responsive to the speed $N_L$ of the engine low speed shaft and to the temperature $T_G$ of the gases leaving the engine combustion chamber. An increase in signal $N_L$ or signal $T_G$ causes the torque motor 95 to move lever control member 94 against a biasing spring 98 in a direction to open valve 93 and thereby to reduce the servo pressure in chamber 89. Resultant movement of control element 88 to reduce fuel flow to the engine also permits the valve inlet 82 to communicate with the low pressure return passage 28, thereby spilling fuel from the inlet 82 to the upstream side of pump 11. This movement of control element 88 reduces the force applied by spring 26 and control member 94 moves to a new equilibrium position.

A valve 99 is manually operable to connect chamber 89 to the low pressure return passage 98, thereby causing valve 83 to become fully shut and all fuel to be spilled to the return passage 28. In this position of control element 88 the valve outlet 84 communicates with a low pressure drain 100.

It is envisaged that the servo pressure signal generating arrangement 40 shall be constructed as a seperate unit, to which a variety of valves, of the same general type as valve 12 but having different flow characteristics, may be attached. For this purpose the piston 30 of valve 12 is coupled to the valve control member 44 in arrangement 40 by means of a detachable connection 101.

I claim:

1. A fluid flow control valve for a gas turbine engine fuel control system, comprising a body having an inlet and first and second outlets, first and second control elements which are slidable relative to each other and to said body, one of said elements being slidable within the other of said elements, said first control element defining, in part, a variable metering orifice and said first and second control elements co-operating to define a throttle valve, said metering orifice and said throttle valve being in series between said inlet and said first outlet, said first and second control elements also co-operating to define a spill valve between said inlet and said second outlet, movement of said second control element to increase flow through said first outlet simultaneously acting to decrease flow through said second outlet, means responsive to a first servo pressure signal for slidably moving said first control element, and means responsive to variations in a second servo pressure signal for slidably moving said second control element.

2. A valve a claimed in claim 1 in which said throttle valve is on the upstream side of said metering orifice.

3. A valve as claimed in claim 1 in which said second control element is slidable within said first control element.

4. A valve as claimed in claim 3 in which said second control element includes a port communicating with said inlet; said port co-operating with an edge of said first control member to define said spill valve.

5. A valve as claimed in claim 1 in which said first and second control elements define between them an annular space, said space lying between said metering orifice and said throttle valve.

6. A valve as claimed in claim 1 in which said means responsive to the first servo pressure signal comprises a first piston slidable in said body for movement with said first control element.

7. A valve as claimed in claim 6 which includes means for detachably connecting said first piston to an associated servo pressure signal generating apparatus.

8. A valve as claimed in claim 1 in which said means responsive to the second servo pressure signal comprises a piston slidable in said body and movable with said second control element.

9. A valve as claimed in claim 1 which includes a spring for urging said second control element in a direction to open said throttle valve and shut said spill valve.

* * * * *